United States Patent [19]

Harris

[11] Patent Number: 5,108,001
[45] Date of Patent: Apr. 28, 1992

[54] PRESSURE RELEASE VENT CAP

[75] Inventor: Robert S. Harris, Connersville, Ind.

[73] Assignee: Stant Inc., Connersville, Ind.

[21] Appl. No.: 547,937

[22] Filed: Jul. 3, 1990

[51] Int. Cl.⁵ .................................... B65D 51/16
[52] U.S. Cl. .................... 220/203; 220/209; 220/303; 220/DIG. 33
[58] Field of Search ......... 220/203, 209, 303, 367, 220/DIG. 32, DIG. 33; 137/493, 493.9, 493.6

[56] References Cited

U.S. PATENT DOCUMENTS

| | | |
|---|---|---|
| 2,006,752 | 7/1935 | Swank . |
| 2,591,562 | 4/1952 | Levell . |
| 2,792,964 | 5/1957 | Reese et al. . |
| 2,865,531 | 12/1958 | Gorst et al. . |
| 2,964,214 | 12/1960 | Stannard . |
| 2,990,971 | 7/1961 | Enell . |
| 3,082,905 | 3/1963 | Friend . |
| 3,098,636 | 7/1963 | Contella . |
| 3,111,239 | 11/1963 | Ivins . |
| 3,112,840 | 12/1963 | Miller et al. . |
| 3,147,881 | 9/1964 | Friend . |
| 3,163,315 | 12/1964 | Wilson . |
| 3,186,580 | 6/1965 | Previte . |
| 3,203,445 | 8/1965 | McCormick . |
| 3,373,894 | 3/1968 | Johnson . |
| 3,434,621 | 3/1969 | Previte . |
| 3,587,912 | 6/1971 | Ohta . |
| 3,616,960 | 11/1971 | Miller et al. . |
| 3,703,245 | 11/1972 | Brewer . |
| 3,854,911 | 12/1974 | Walker . |
| 4,036,399 | 7/1977 | Gerdes . |
| 4,245,751 | 1/1981 | Neiman . |
| 4,271,976 | 6/1981 | Detwiler . |
| 4,498,493 | 2/1985 | Harris . |
| 4,572,396 | 2/1986 | Kasugai et al. . |
| 4,579,244 | 4/1986 | Fukuta . |
| 4,588,102 | 5/1986 | Kasugai . |
| 4,676,390 | 6/1987 | Harris . |
| 4,726,488 | 2/1988 | Kasugai . |
| 4,779,755 | 10/1988 | Harris .................. 220/203 |
| 4,795,053 | 1/1989 | Kasugai et al. .......... 220/203 |
| 4,887,733 | 12/1989 | Harris . |
| 4,913,303 | 4/1990 | Harris .................. 220/204 |

Primary Examiner—Stephen Marcus
Assistant Examiner—Stephen Cronin
Attorney, Agent, or Firm—Barnes & Thornburg

[57] ABSTRACT

A pressure relief and venting closure cap for a filler neck of a vehicle gas or coolant system tank having an initial rotary drive which opens a vent valve in response to a differential movement between a cap shell and a vent valve actuator to vent the filler neck and wherein continued rotation of the cap shell causes disconnection of the cap shell and the filler neck. There are two separate drives from the cap shell, one to operate the vent valve and one to rotate a sealing element which screwingly connects the cap to the filler neck. A lost motion connection is provided for the drive to the sealing element so that disconnection can only take place after venting. A torque over-ride is provided for the closure to limit its rotary closing screwing movement after the vent valve is closed. A second drive between the lost motion connection and the vent valve is provided to stop differential rotation between the cap shell and the vent valve actuator when the closure member is rotated.

28 Claims, 3 Drawing Sheets

PRESSURE RELEASE VENT CAP

BACKGROUND AND SUMMARY OF THE INVENTION

The invention relates to venting and pressure relief caps utilized for automotive vehicle tanks having fill necks. More specifically the present invention relates to drive mechanisms which translate rotation of a cap shell to independently operate a vent valve and rotatable closure member to secure the cap shell to the fill neck of the vehicle gas or coolant system tank.

The invention further provides for a lost motion drive connection for the closure drive to insure opening of the vent valve prior to uncoupling of the cap from the filler neck.

Previous cap designs have involved cumbersome drive mechanisms which required multiple parts and overlapping drive paths for the vent valve and closure drive. An example of such cap designs can be found in my U.S. Pat. Nos. 4,676,390 of Jun. 30, 1987 and 4,887,733 issued Dec. 19, 1989. Here the drive path for the vent valve includes part of the drive structure utilized for the closure function. Additionally these prior inventions require a drive hub, race, plunger, closure member and retainer mechanism to transmit rotary motion of the cap shell to both the vent valve and the closure device.

It is an object of this invention to provide a reliable pressure relief venting cap utilizing but a few part and with separate drives for the vent valve and closure securing mechanism.

It is a further object of the invention to provide sequential timing between the vent valve operation and the cap closure operation.

It is a still further object of the invention to provide a torque over-ride for the cap to minimize the possibility of damage to the closure mechanism from rotating the cap shell too much.

Additionally, the invention takes advantage of utilization of screw threads to provide for an effective sealing between the closure mechanism and the filler neck. This is advantageous since screw thread necks are easily installed and removed and also provide excellent sealing advantages. Use of screw threads advance the cap uniformly onto the filler neck. In this environment the old method of venting a cap by turning to vent and then pushing down for further rotation to uncouple the cap from the filler neck cannot occur, since screw threads prohibit downward pushing of the cap.

The closure means is a two portion closure. One portion grips the threads of the filler neck in a sealing manner to secure the cap to the filler neck while the other portion overlies the opening in the filler neck.

Since gas and coolant system tanks are pressurized due to expansion of tank contents and depressurized due to contraction and/or loss of tank contents, caps must be able to accommodate positive and negative changes in pressure. It is desirable of course to allow for some tank pressurization without venting to the atmosphere. This is true both to keep volatile fuel hydro-carbons from contaminating the air people breathe as well as to avoid loss of engine coolant. Accordingly, the invention contemplates a pressure relief assembly that does not open until user safety necessitates excess pressure relief. Likewise, the invention limits opening upon vacuum conditions to necessary operating tank pressure vacuum release conditions.

Because of safety conditions, the invention inhibits cap removal prior to venting of the tank. This not only insures that both the tank contents and cap will not spray or fly off into or against the hand and body of the person removing the cap, but also reduces the force necessary to remove the cap.

To this end the invention provides that initial attempts to remove the cap causes venting of the excess pressure prior to any rotation or release of the cap and the filler tank closure mechanism.

This is obtained through a lost motion connection between the cap shell and the closure device wherein initial removal rotation of the cap shell first vents the filler neck and that only after venting does continued rotation of the cap shell cause the closure means to rotate so as to be separable from the filler neck.

It is also an object of the invention to provide a torque responsive over-ride between the cap shell and the rotatable closure in order to insure that the closure member is not overstressed. This torque responsive over-ride takes place through a free wheel ratchet and a lost motion drive between the shell and the closure member. Excess torque will cause the free wheel drive to ratchet and allow the cap shell to rotate freely of the closure mechanism and thus prevent over stressing of the closure mechanism. The ratchet vibrations provides an indicator to the person tightening the cap that the cap is fully secured.

To provide ease in use the rotary motion that is used to release the closure mechanism is also utilized to actuate the vent valve. The invention obtains an axial shifting of the vent valve upon initial rotation of the cap shell. Once opened, the vent remains open to insure full venting prior to rotation of the closure mechanism to remove the sealing closure.

Because the free-wheel torque responsive mechanism allows for continued rotation of the cap shell even though the sealing closure is not rotated, an interlock has to be provided to insure that the vent valve retains its closed position during tightening. To this end the invention contemplates relative rotation between a vent valve actuator and the cap shell to cause actuation of the vent valve.

The invention also contains a drive mechanism for the vent valve actuator to cause it to rotate with the cap shell to avoid the aforesaid relative rotation and thus any further vent valve movement under torque overload conditions while the cap shell continues to rotate. This enables the vent valve to retain its closed position upon cap free wheeling and thus the user does not have to be concerned with the actual position of the cap in a closed position, since the vent will remain closed.

It is still a further object of the invention to pre-arm the vent valve to insure that initiation of any reverse cap shell rotation always opens the vent valve prior to rotation of the closure mechanism. Thus a user does not have to concern itself with any alignment of the cap shell in the closed position.

Other objects, advantages and novel features of the present invention will become apparent from the following detailed description of the invention when considered in conjunction with the accompanying drawings.

DETAILED DESCRIPTION OF THE DRAWINGS

Figure 1:
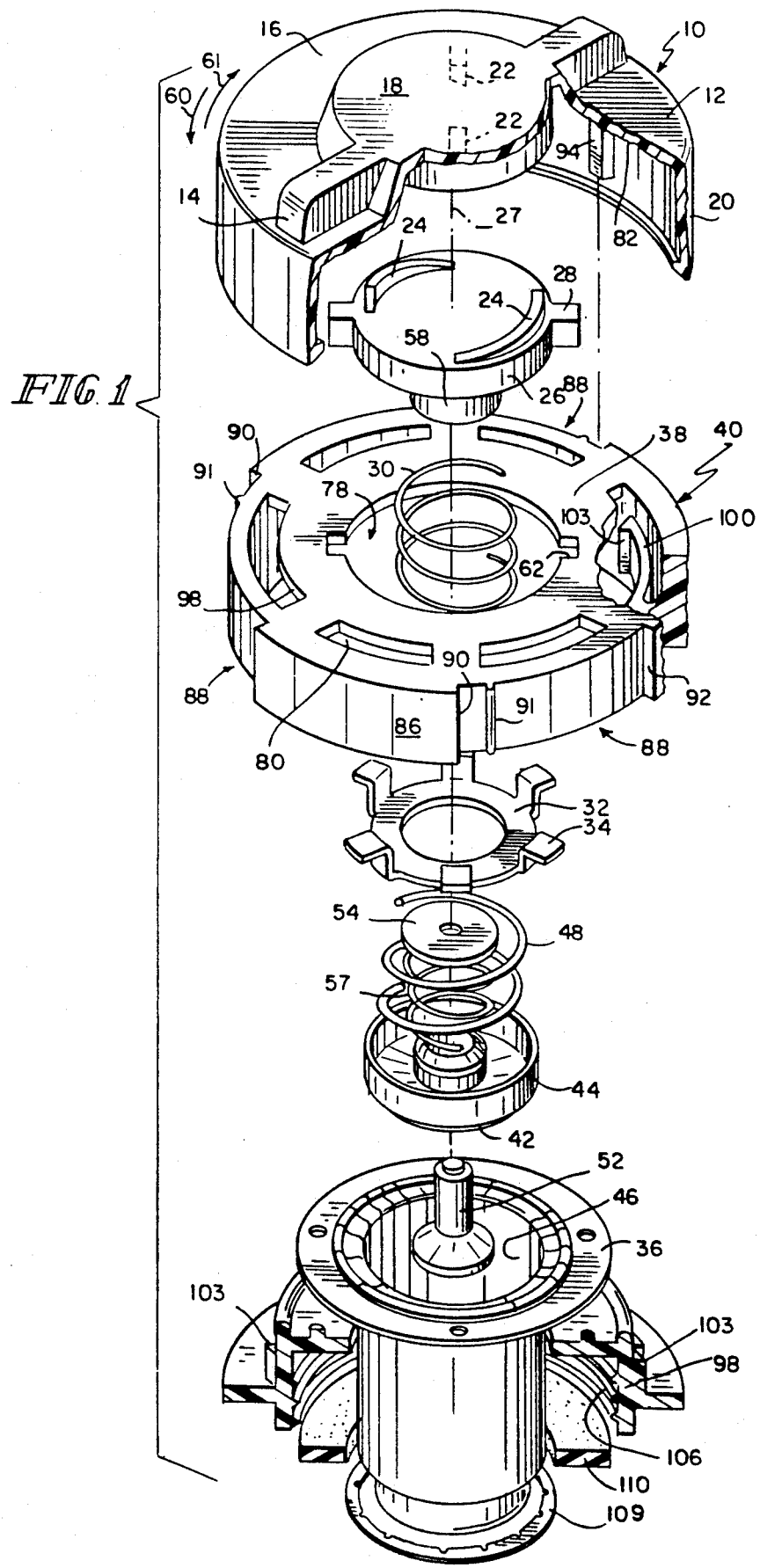
FIG. 1 is an exploded assembly view of a preferred embodiment of the cap.
Figure 2:
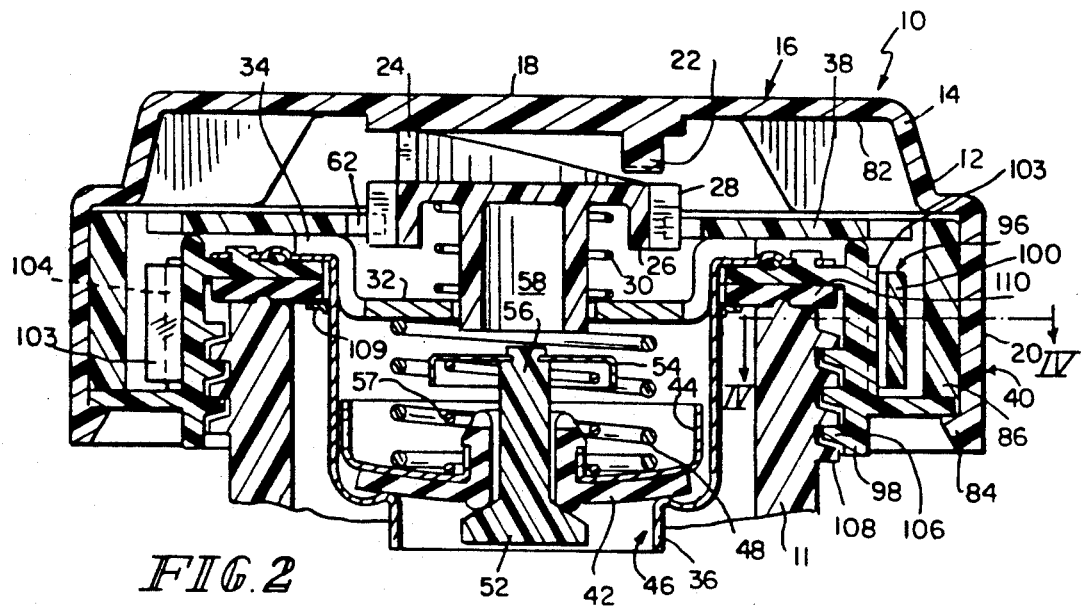
FIG. 2 is a cross-section of the embodiment of FIG. 1 in a closed vent position.
Figure 3:
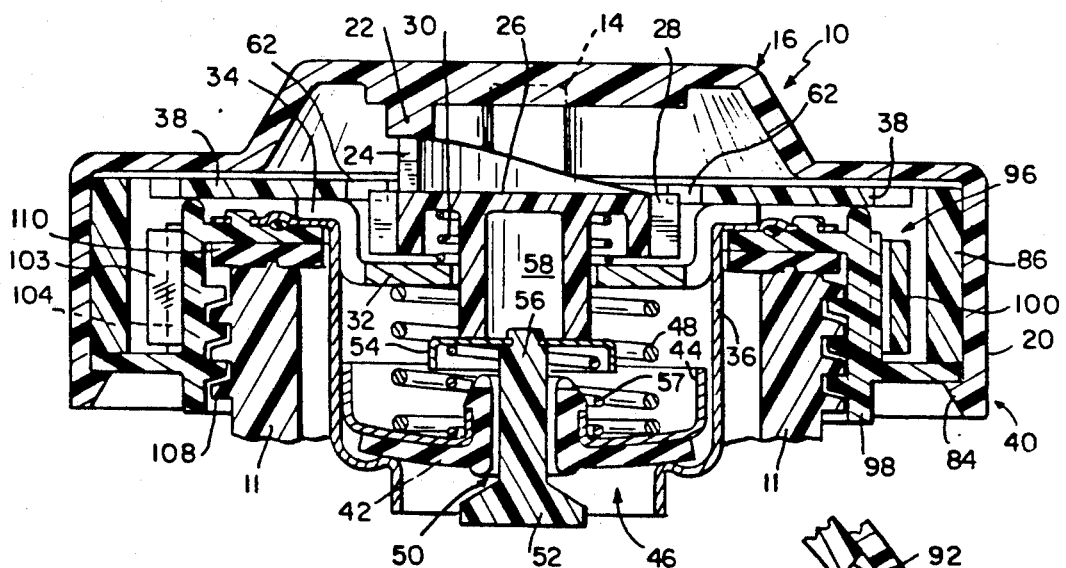
FIG. 3 is a cross-section of the embodiment of FIG. 1 in an open vent position.

FIGS. 1-3 show an automotive cap 10 having an outer extending cap shell 12 with finger grips 14 on its upper facing surface 16. The cap shell 12 has a central portion 18 and an outer skirt portion 20. The central portion 18 has downwardly depending drive lugs 22 for drivingly engaging driver cams 24 on vent valve actuator 26. While two lugs 22 and two cams 24 are shown it should be recognized that one or more can be utilized. Although two lugs are shown in the drawings, it will be understood that a single bar (not shown) extending between the two lugs 22 could also be used. The lugs 22 axially shift the actuator 26 downward along rotation centerline 27 as the center portion 18 of the cap shell 12 is rotated and the lugs 22 come into contact with the cams 24 as will be explained later, it is desirable that plural lugs 22 and cams 24 be utilized so equal forces will be applied to actuator 26 and therefore there will be no tendency for the actuator 25 to cant under force from the lugs 22. For this reason it is desirable that there be a plurality of lugs 22 and equal number of cams 24 uniformly spaced about the centerline 27.

The vent valve actuator 26 has ears 28, the purpose for which will be explained later and is spring biased upwardly by bias spring 30. The bias spring 30 is held at its bottom by retainer 32 that is secured through holding arms 34 that are either fixedly secured to the filler neck opening member 36 adjacent an inwardly extending shelf portion 38 of closure member 40, or alternatively the arms can just rest on the opening member 36. The opening 46 in opening member 36 is closed by an excess pressure relief bottom valve surface 42 on valve member 44. The valve member 44 is biased downward to seal the actual opening 46 in opening member 36 by bias spring 48 located to abut between the valve 44 and the retainer 32.

The valve 44 and valving surface 42 have a vent opening 50 therein. This vent opening 50 is closed by vent valve 52 which has a second spring retainer 54 secured to its upper end 56. A second bias spring 57 acts between vent valve 44 and the second spring retainer 54 to bias the retainer 54 upwardly toward a bottom edge 58 of the vent valve actuator and thus bias the vent valve 42 into a closed position with respect to vent opening 50. Upon excess vacuum in the filler neck 11, the vent valve 52 can open downwardly as an excess vacuum relief.

Figure 4:
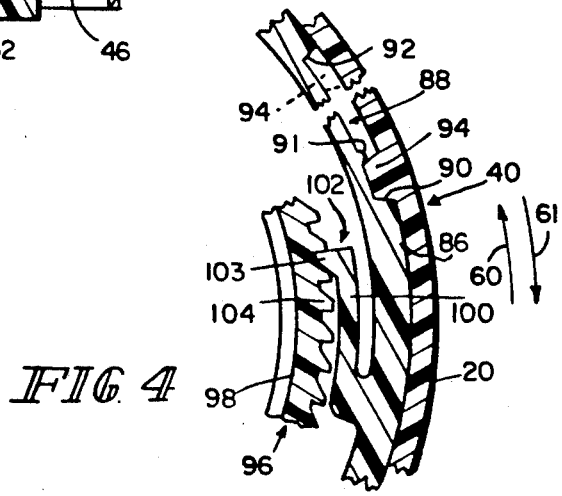
FIG. 4 is a partial plan view of the lost motion and free wheeling torque responsive drives between the cap shell and the closure member.

The normal operation of the vent valve 52 is as follows. Upon counter-clockwise rotation of the outer shell 12 (arrow 60 FIGS. 1 and 4) lug 22 will rotate and contact cams 24. Continued rotation of shell 12 will force the cams 24 downwardly to drive vent valve actuator 26 downwardly from the FIG. 2 position to the FIG. 3 position. This is true since ears 28 on the vent valve actuator 26 are located in slots 62 of the shelf portion 38 of the closure member which is now stationary and thus the lugs 22 cannot impact rotation to the vent valve actuator 26, but can only translate it axially downward along centerline 27. When the lower end 58 of the vent valve actuator 26 engages the retainer 54 it forces the retainer 54 and its attached vent valve 52 downward to open passageway 50 (FIG. 3). Liquid or vapors at the orifice 46 can escape upwardly around vent valve passageway 50, around springs 57, 48, through the hollow center 78 of closure 40 and outwardly under the bottom surface 82 of the shell 12 and down through holes 80 in the closure member 40 and out the bottom of the shell 12 adjacent the lowest point 84 of the shell 12.

Upon excess pressure at opening 46 valve 44 will lift upwardly to allow the filler pipe 11 to empty around the outside of valve 44 and out the aforementioned vent passage. If the vent valve 52 is held from moving upwardly by the cam 24 and lugs 22, venting will also take place around the vent valve 52 as the vent valve seat in surface 42 is raised.

Closure member 40 has an outwardly located downwardly depending edge 86 which has at least one channel 88 on its outer periphery (three are shown). Each channel 88 has two flats 90 and 92 at its respective ends as shown best in FIG. 1 and accommodates a driver member 94 located on the inner surface of the outer skirt portion 20 of the shell 12. The driver member 94 is integral with and rotates with the shell 12. When the shell 12 is rotated clockwise (direction arrow 61) the driver member 94 abuts end 90 to the drive the closure 40 to rotate clockwise. When the shell 12 is rotated counter-clockwise (direction arrow 60) from this previous abutting position at end 90, the shell and attached drive member 94 rotates in the channel 88 without rotation of the closure member 40 until the driver 94 abuts end 92. Then the driver 94 causes the closure member 40 to rotate counter-clockwise. Thus as long as driver 94 does not abut either end 90, 92 of channel 88, the closure member 40 is not rotated. During this no-rotation of the closure member the ears 28 of the vent valve actuator 26 are held stationary so that rotation of the shell 12 causes relative motion between cams 24 and lugs 22 to either have the lugs 22 drive the vent valve 52 downward to open or allow bias spring 30 to drive the vent actuator 26 upward whereupon bias spring 57 will push retainer 54 upward to close vent valve 52.

When the driver 94 engages either end 90, 92 the closure member 40 rotates with the shell 12 and through ears 28 and slots 62 causes the vent valve actuator 26 to also rotate. Without relative rotation between the lugs 22 on the shell 12 and the cams 24 on the actuator 26, no raising or lowering of the vent valve 52 occurs.

Thus it can be seen that starting from the closed position (driver against end 90) the shell 12 can be rotated counter-clockwise (direction 60) and the ears 28 will remain stationary with the non-moving closure and thus lugs 22 will ride on cams 24 forcing the vent valve actuator 26 to lower and have its end 58 push down on retainer 54 to drive vent valve 52 into its open position. The channel 88 is long enough to insure that the lugs 22 engage the high point of cams 24 to completely open the vent valve 52 to vent the filler neck prior to the driver engaging end 92 to rotate the closure 40 counter-clockwise. Rotation of the driver 94 in the channel 88 clockwise causes the lugs 22 to move downward on the cams 24 to allow the vent valve actuator 26 to move upwardly and completely close the vent valve 52 as the drive nears the end. Safety ridges 91 hold the driver 94 in its closed position against end 90 so that normal vehicle driving vibrations do not loosen the cap. Here the driver 94 slips over the ridge 91 as it is moved in direction 61, but the ridge 91 offers resistance to reverse movement (direction 60).

A torque responsive closure 96 couples the outer portion 86 of the closure member 40 to the inner portion 98 underneath the shelf 38. Spring arms 100 are attached to the inside surface 102 of the outer rim 86 of the closure member 40. When the driver 94 drives the outer rim 86 of the closure member 40 counter-clockwise (direction arrow 60 FIG. 4) a positive drive from the teeth 103 on the arms 100 engaging ratchet teeth 104 on the inward edge of the closure member 98 occurs so that the closure member 98 is rotated. The shelf 38 is also rotating, since ears 28 (engaged by slot 62) cause the actuator 26 to rotate so no displacement of the actuator occurs. When the driver 94 is reversed to clockwise rotation (direction arrow 61), drive through the ratchet occurs until a level of resistance is reached, which causes the arms 100 to allow teeth 103 to ratchet over teeth 104. Here the shell 12 and the shelf 38 will rotate, while the inner closure portion 98 remains stationary. As the shelf 38 rotates no displacement of the vent valve actuator 26 occurs.

This inner portion 98 includes sealing screw threads 106 which sealing cooperate with threads 108 on an external surface of the filler pipe 11. The sealing threads 106 provide a seal to the filler pipe 11 and a screw coupling to hold the shell 12 to the filler pipe 11. A seal pad 110 rests on top of the filler pipes to provide a seal therewith when the screw threads 108 of the filler pipe 11 pull the closure element downwardly by coaction with the threads 106. The pad can be glued to the threaded portion 106 and/or held by a lip member 109 mounted on the opening member 36 so as to have the pad 110 be removable with the cap as a unit. When the pad 110 rubs the top of the filler pipe 11, this adds to the frictional force on the ratchet teeth 103, 104 to cause the ratcheting and release the drive to the threads 106, 108 while maintaining the drive to the shelf 38.

Figure 5:
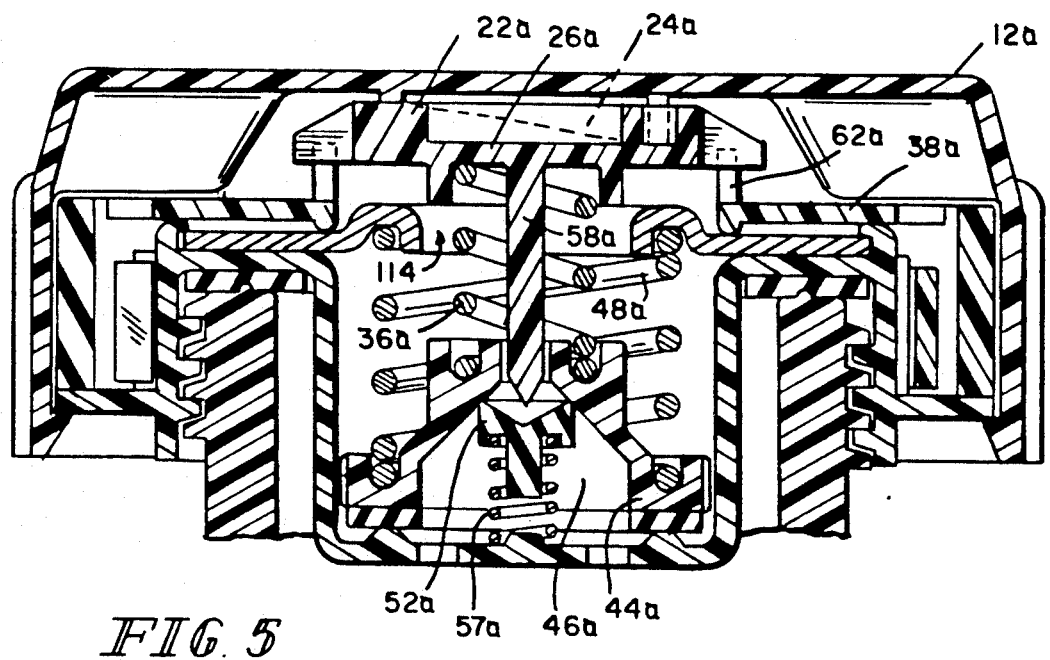
FIG. 5 is a cross-sectional view of an alternative construction for the vent valve taken in the closed position similar to FIG. 2.
Figure 6:
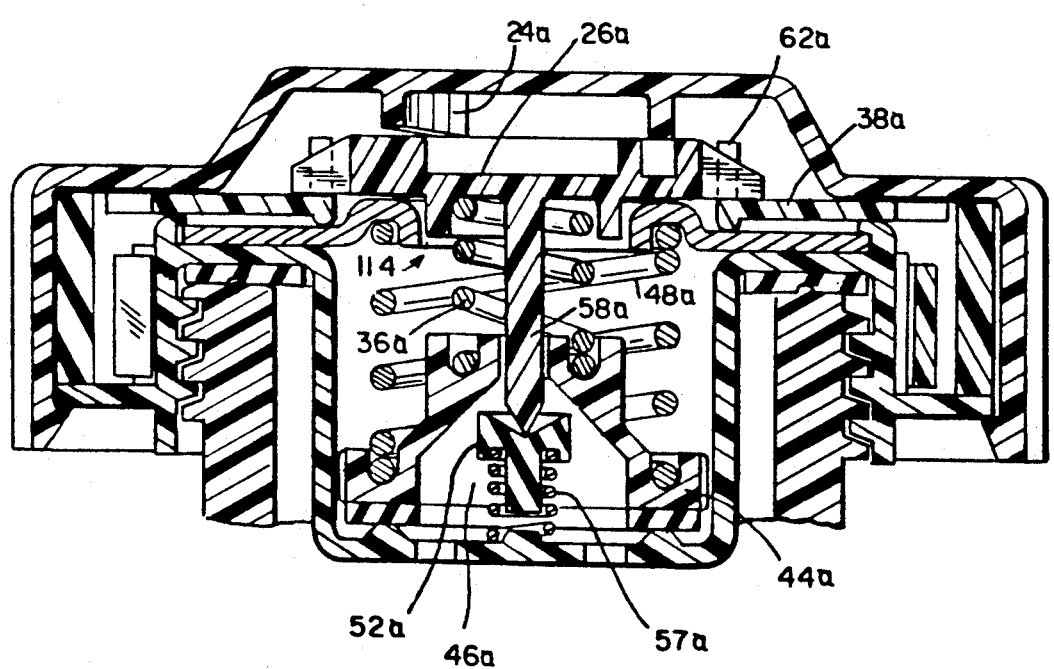
FIG. 6 is a cross-sectional view of the alternative vent valve of FIG. 5 taken in the open position similar to FIG. 3.

FIGS. 5 and 6 show a variant actuating spring structure to that of FIGS. 1-3. This variant is shorter in height than that of FIGS. 1-3. Elements that function similarly to FIGS. 1-3 have same number with the letter (*a*) thereafter. Here cam surfaces 24(*a*) are located on the underside of the cap shell 12(*a*) and lugs 22(*a*) are on the vent valve actuator 26(*a*) although these could be reversed. The vent valve actuator 26(*a*) has a lower portion 58(*a*) that contacts vent valve 52(*a*). The spring 48(*a*) biases the pressure relief valve 44(*a*) against opening 46(*a*). Only spring 36(*a*) operates to bias the vent valve actuator upwardly. Spring 57(*a*) acts to bias the vent valve 52(*a*) closed. Here the lower portion 58(*a*) of the vent valve actuator extends through the relief valve 44(*a*) rather than having the vent valve 52(*a*) extend through the relief valve 44(*a*). Also the retainer 32(*a*) has an enlarged center hole 114 to allow for passage of the spring 36(*a*). Here the ears 28(*a*) are shorter in height and the slots 62(*a*) have extended side walls. Here the opening member 36(*a*) is plastic or rubber and made unitary with the shelf 38(*a*). Thus it is quite apparent that this species operates in the same manner as that of FIGS. 1-3.

It goes without saying that the species of FIGS. 1-3 can have the lugs and cams reversed as shown in FIGS. 5 and 6 and vice versa.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A pressure relief, vent and closure cap rotatably engageable with a tank filler neck having an opening, comprising an outer rotatable shell means rotatable about an axis and having an inner drive portion and an outer skirt portion, a movable pressure relief valve means for opening and closing the filler neck opening upon an excess pressure being developed in said filler neck and having a vent passage therein, first bias means for moving said pressure relief valve means to close said filler neck opening, a movable vent valve means for opening and closing said vent passage, second bias means for moving said vent valve means to close said vent passage, a rotatable drive hub means axially shiftable in a first direction along said axis in response to relative rotary movement of said inner drive portion of said outer rotatable shell means with respect to said drive hub means, a third bias means for resisting shifting of said rotatable hub means, said drive hub means contacting said vent valve means after said drive hub means has been axially shifted a first axial distance in opposition to said third bias means and along said direction by a limited rotation of said inner drive portion of said rotatable shell means with respect to said drive hub means, wherein further rotation of said inner drive portion of said rotatable shell means with respect to said drive hub means in a same rotative direction further axially shifts said drive hub means to move the vent valve means in opposition to said second bias means to open said vent passage, rotatable closure means for sealing attachment to said filler neck and said opening, lost motion drive means connected between said outer skirt portion and said rotatable closure means to rotate said rotatable closure means to screwingly detach and attache said outer shell means to said filler neck in response to rotary movement of said outer skirt, said lost motion drive means only allowing said rotatable closure means to be detached from said filler neck when the rotatable shell means is rotated in said same rotational direction in excess of the further rotation that causes the vent passage to open, wherein rotation of said shell means in a direction reverse to said first direction first causes said inner drive mechanism to allow said second bias means to close said vent passage, and wherein continued rotation of said shell means in said reverse direction past a rotative position that causes the closure of said vent valve means then causes the outer skirt portion to rotate the rotatable closure means through the lost motion connection to sealingly and screwingly attach the outer shell means to said filler neck, the lost motion drive means including an input side that has at least one track thereon, the track having end portions which are drivingly engaged by a lug on the outer skirt portion when rotation of the rotatable drive hub occurs and which ends do not engage the lug at other times so as to allow the lug to freely traverse the track when drive to the rotatable drive hub does not occur.

2. A cap rotatably engageable with a tank filler pipe having an opening comprising an outer rotatable shell means rotatable about an axis and having an inner drive portion and an outer skirt portion, a movable pressure relief valve means for opening and closing the filler neck opening upon an excess pressure being developed in said filler neck and having a vent passage therein, first bias means for moving said pressure relief valve means to close said filler neck opening, a movable vent valve means for opening and closing said vent passage, second bias means for moving said vent valve means to close said vent passage, a rotatable drive hub means axially shiftable in a first direction along said axis in response to relative rotary movement of said inner drive portion of said outer rotatable shell with respect to said drive hub means, said drive hub means contacting said vent valve means after said drive hub means has been axially shifted a first axial distance, along said direction by a limited rotation of said inner drive portion of said rotatable shell means and wherein further rotation of said inner drive portion of said rotatable shell means in a same direction further axially shifts said drive hub means to move the vent valve means in opposition to said second bias means to open said vent passage, rotatable closure means for sealing attachment to said filler neck and said opening, said rotary closure means including thread sealing means which thread sealing means is adapted to mate with threads located on said filler neck upon rotation of said threaded sealing means, lost motion drive means connected between said outer skirt portion and said rotatable closure means to rotate said rotatable closure means to thread and unthread said outer shell means to said filler neck in response to rotary movement of said outer skirt, said lost motion drive means only allowing said rotatable closure means to be detached from said filler neck when the rotatable shell means to rotated in said direction in excess of the further rotation that causes the vent passage to open, the lost motion drive means including an input side that has at least one channel thereon, the channel having end portions which are drivingly engaged by a lug on the outer skirt portion when rotation of the rotatable drive hub means occurs and which ends do not engage the lug at other times so as to allow the lug to freely traverse the channel when drive to the rotatable drive hub does not occur.

3. A cap rotatably engageable with a tank filler neck having a mouth, the cap comprising means for engaging the filler neck, the engaging means providing a filler neck venting passageway open to the atmosphere, means for normally closing the filler neck venting passageway, means for selectively actuating the closing means to open the filler neck venting passageway, means for selectively rotating the engaging means relative to the filler neck in at least a cap-removal direction, the rotating means including a handle including an interior surface and means appended to the interior surface for moving the actuating means against the closing means so that the closing means is moved from a passageway-closing position to a passageway-opening position upon rotation of the rotating means in the cap-removal direction prior to rotation of the engaging means, and means for releasing the actuating means from the closing means when the rotating means applies an excess torque to the closing means and the closing means is in the passageway-closing position.

4. The cap of claim 3, wherein the moving means includes at least one drive element depending from the interior surface of the handle and the actuating means includes at least one driven element in engagement with the at least one drive element.

5. The cap of claim 4, wherein the drive element is configured to impart rectilinear movement to the actuating means in response to rotation of the driven element about its axis of rotation during rotation of the rotating means in the cap-removal direction so that the direction of motion of the actuating means is substantially parallel to the axis of rotation of the at least one drive element.

6. The cap of claim 3, wherein the engaging means includes a closure member configured to close the filler neck and an inner surface defining a first venting aperture through the closure member and providing a valve seat surrounding the venting aperture, the closing means includes a pressure-relief valve positioned in the second venting aperture, and means for yieldably biasing the pressure-relief valve in an axially inward direction against the valve seat normally to close the first venting aperture and for yieldably biasing the vacuum-relief valve in an axially outward direction against the pressure-relief valve normally to close the second venting aperture, and the actuating means includes a plunger axially movable in the engaging means to a vacuum-relief valve-actuating position moving the vacuum-relief valve against the biasing means upon movement of the actuating means to said actuating position to open the second venting aperture in response to rotation of the handle relative to the filler neck.

7. The cap of claim 6, wherein the driven element is cylindrical to define an axis of rotation and is configured to impart rectilinear movement of the actuating means in response to rotation of the driven element about its axis of rotation during rotation of the shell means in the cap-removal direction so that the direction of motion of the actuating means is substantially parallel to the axis of rotation of the driven element.

8. The cap of claim 6, wherein the actuating means further includes means interconnecting the plunger and the engaging means for blocking rotation of the plunger during axial movement toward its vacuum-relief valve-actuating position.

9. The cap of claim 8, wherein the moving means includes at least one drive element depending from the interior surface of the handle and the actuating means includes at least one driven element in engagement with the at least one drive element.

10. A cap rotatably engageable with a tank filler neck having a mouth, the cap comprising closure means rotatably engaging the filler neck for closing the filler neck, the closure means including means for selectively establishing a passage extending through the closure means to interconnect an interior region of the filler neck and atmosphere surrounding the filler neck in fluid communication, means for extending into the closure means for actuating the establishing means, the means for extending being movable relative to the closure means between inactive and actuating positions, shell means for providing a hand grip to permit rotation, the shell means including a handle having an interior surface and means appended to the interior surface for moving the means for extending to its actuating position in response to rotation of the shell means relative to the filler neck in a cap-removal direction without substantially rotating the closure means relative to the filler neck, said shell means moving said closure means to a position closing said passageway upon reverse rotation of the shell means, and overload means disconnecting said shell means from the closure means when said closure means closes said passageway.

11. The cap of claim 10, wherein the moving means includes at least one drive element depending from the interior surface of the handle and the means for extending includes at least one driven element in engagement with the at least one drive element.

12. The cap of claim 11, wherein the engaging means includes a closure member configured to close the filler neck and an inner surface defining a first venting aperture through the closure member and providing a valve seat surrounding the venting aperture, the closing means includes a pressure-relief valve formed to include a second venting aperture, a vacuum-relief valve positioned in the second venting aperture, and means for yieldably biasing the pressure-relief valve in an axially inward direction against the valve seat normally to close the first venting aperture and for yieldably biasing the vacuum-relief valve in an axially outward direction against the pressure-relief valve normally to close the second venting aperture, and the actuating means includes a plunger axially movable in the engaging means to a vacuum-relief valve-actuating position moving the vacuum-relief valve against the biasing means upon movement of the actuating means to an actuating position to open the second venting aperture in response to rotation of the rotating means relative to the filler neck.

13. The cap of claim 11, wherein the actuating means further includes means interconnecting the plunger and the engaging means for blocking rotation of the plunger during axial movement toward its vacuum-relief valve-actuating position.

14. A cap rotatably engageable with a tank filler neck having a mouth, the cap comprising closure means for engaging and closing the filler neck, vent path means for providing a controllable vent path through said closure means, means for opening said vent path upon movement of the opening means relative to the closure means from an inactive position to an actuating position, shell means for selectively rotating said closure means relative to said filler neck, the shell means including a handle and means fixed to the handle for camming the opening means to impart motion to the opening means upon rotation of the shell means in a selected direction preparatory to rotating the closure means within the filler neck so that the opening means is moved relative to the closure means to its actuating position to open the vent path means, said shell means upon reverse rotation causing said closure means to engage and close said filler neck, and releasing means for disconnecting rotation of said shell means from the closure means when said closure means closes the filler neck.

15. The cap of claim 14, wherein said opening means comprises a plunger configured to move axially within said closure means.

16. The cap of claim 15, wherein said camming means includes at least one cylindrical cam for axially displacing said plunger within said closure means in response to rotational movement of said shell means.

17. The cap of claim 16, wherein said vent path means includes a vent passageway and a pressure-vacuum valve in the vent passageway.

18. The cap of claim 17, wherein said plunger is configured to displace a portion of said pressure-vacuum valve when said plunger is moved axially downwardly by said at least one cylindrical cam.

19. The cap of claim 18, wherein said shell means is configured to rotate freely around said closure means during an initial portion of the rotation in the first direction followed by engaging rotation with respect to said closure means to engage said closure means with said filler neck, and said shell means is configured to rotate freely around said closure means during an initial portion of the rotation in the direction opposite said first direction followed by engaging rotation with respect to said closure means to disengage said closure means from said filler neck.

20. The cap of claim 19, wherein said shell means and said at least one cylindrical cam cooperate to move said plunger axially downwardly to displace a portion of said pressure-vacuum valve during a predetermined part of the initial portion of the rotation of said shell means in the direction opposite said first direction to begin venting and said shell means and said at least one cylindrical cam also cooperate to provide means for sustaining a venting during continued rotation of the shell means through a remaining part of the initial portion of the rotation in the direction opposite said first direction and before said shell means is coupled to said closure means to disengage said closure means from said filler neck.

21. A cap rotatably engageable with a tank filler neck having a mouth, the cap comprising closure means including a closure member rotatably engaging the filler neck, seal means for establishing a seal between the closure member and the filler neck, a handle rotatable between a cap-retaining position and a cap-removing position, the handle including an interior surface and at least one driving member depending from the interior surface, actuation means responsive to a force applied by the driving member upon rotation of the handle in a cap-removal direction for creating a vent passageway between the filler neck and the atmosphere through the sealed closure means, the actuation means maintaining the seal established by the seal means during a predetermined amount of rotation of the handle in the cap-removal direction from its cap-retaining position to accommodate discharge through the vent path prior to breaking the seal established by the seal means, said handle upon reverse rotation coupling said closure means to engage and seal the filler neck, releasing means for disconnecting said handle from said closure means in response to excess torque being applied thereto when the closure means is in its sealed position.

22. The cap of claim 21, wherein the handle further includes drive means for applying a rotation-inducing torque to the closure means during continued rotation of the handle past said predetermined amount of rotation, the drive means establishing a lost-motion connection between the handle and the closure means to delay rotation of the closure means relative to the filler neck and breakage of the seal established by the seal means until after the pressure in the filler neck has substantially normalized due to discharge through the vent path.

23. The cap of claim 21, wherein the moving means includes at least one drive element depending from the rotating means and the actuating means includes at least one driven element in engagement with the at least one drive element.

24. The cap of claim 21, wherein the closure means includes an inner surface defining a first venting aperture and providing a valve seat surrounding the venting aperture, the establishing means includes a pressure-relief valve formed to include a second venting aperture, a vacuum-relief valve positioned in the second venting aperture, and means for yieldably biasing the pressure-relief valve in an axially inward direction against the valve seat normally to close the first venting aperture and for yieldably biasing the vacuum-relief valve in an axially outward direction against the pressure-relief valve normally to close the second venting aperture, and the actuation means includes a plunger axially movable in the closure means to a vacuum-relief valve-actuating position moving the vacuum-relief valve against the biasing means upon movement of the actuation means to its actuating position to open the second venting aperture in response to rotation of the handle relative to the filler neck.

25. The cap of claim 24, wherein the actuation means further includes means interconnecting the plunger and the closure means for blocking rotation of the plunger during axial movement toward its vacuum-relief valve-actuating position.

26. A cap rotatably engageable with a tank filler neck having a mouth, the cap comprising a closure rotatably engageable with the filler neck to cover the filler neck mouth and formed to include a vent passageway extending therethrough in communication with the filler neck, a valve supported int he vent passageway for movement between passageway-opening and passageway-closing positions, a handle shell including a drive member positioned to apply a rotation-including drive force to the closure upon rotation of the handle shell, a plunger supported in a space between the handle shell and the closure for movement between inactive and valve-actuating positions, the handle shell including an interior surface and at least one cam member appended to the interior surface and configured to move the plunger to its valve-actuating position upon rotation of the handle shell in a cap-removal direction, thereby moving the valve to its passageway-opening position, and torque over-ride means connected between the handle and the closure member to disconnect rotation of the handle from the closure member when the closure member completely closes the filler neck.

27. The cap of claim 26, wherein the valve is a vacuum-relief valve.

28. The cap of claim 27, wherein the plunger includes a driven cam for riding on the cam member and a spring acting between the plunger and the closure to urge the driven cam into camming engagement with the cam member on the handle shell.

* * * * *